United States Patent
Pavez Aranguiz

(10) Patent No.: US 7,803,863 B2
(45) Date of Patent: Sep. 28, 2010

(54) FILLER-CONTAINING POLYMER DISPERSION, METHOD FOR ITS PRODUCTION AND USE

(75) Inventor: Roberto Pavez Aranguiz, Graneros (CL)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 10/685,613

(22) Filed: Oct. 15, 2003

(65) Prior Publication Data

US 2004/0077761 A1    Apr. 22, 2004

Related U.S. Application Data

(62) Division of application No. 09/869,467, filed as application No. PCT/EP99/10151 on Dec. 21, 1999.

(30) Foreign Application Priority Data

Dec. 30, 1998  (CL) ..................... 3177/98
Feb. 2, 1999   (DE) ................. 199 03 801

(51) Int. Cl.
C08F 283/00   (2006.01)
C08F 2/16     (2006.01)
C08F 2/08     (2006.01)
C08F 2/44     (2006.01)
C08F 218/08   (2006.01)
C08J 3/02     (2006.01)
C08J 3/22     (2006.01)
C04B 24/26    (2006.01)
C08G 18/62    (2006.01)
C08G 73/10    (2006.01)

(52) U.S. Cl. .................. 524/457; 524/501; 524/459; 524/845; 524/846; 524/487; 524/763; 524/458; 524/460; 524/461; 524/800; 524/803; 524/819; 524/832

(58) Field of Classification Search ............ 524/457, 524/501, 459, 845, 846, 487, 763, 458, 460, 524/461, 800, 803, 819, 832

See application file for complete search history.

(56) References Cited

U.S. PATENT DOCUMENTS

| | | | |
|---|---|---|---|
| 3,884,871 A | 5/1975 | Herman et al. | ........... 260/42.14 |
| 4,272,424 A | 6/1981 | Kitamura et al. | ........... 260/29.6 |
| 4,421,660 A | 12/1983 | Solc nee Hajna | |
| 4,608,401 A * | 8/1986 | Martin | ......................... 523/205 |
| 5,959,027 A | 9/1999 | Jakubowski et al. | |
| 5,985,992 A | 11/1999 | Chen | |
| 6,133,398 A | 10/2000 | Bhat et al. | |
| 6,140,394 A * | 10/2000 | Kamiyama et al. | .......... 523/315 |
| 6,239,224 B1 | 5/2001 | Mørk et al. | |

FOREIGN PATENT DOCUMENTS

| | | |
|---|---|---|
| CL | 201-1995 | 8/1995 |
| CL | 38-97 | 11/1997 |
| CL | 496-98 | 6/1998 |
| CL | 2969-98 | 10/1998 |
| DE | 22 43 687 | 3/1973 |
| EP | 0 392 065 | 1/1994 |
| EP | 0 666 290 A1 | 8/1995 |
| EP | 0 687 713 B1 | 12/1995 |
| EP | 0 718 329 | 6/1996 |
| GB | 2035342 | 11/1979 |
| RU | 94005691 | 11/1995 |

OTHER PUBLICATIONS

Product literature by hielscher ultrasonics gmbh, warthestrasse 21, 14513 teltow, germany, © copyright 1999-2006. http://www.hielscher.com/ultrasonics/size_reduction_silica_01.htm.*
Uschkov, S. N.: "PWS i ego proiswodniye", Moskay-Leningrad Goschimisdat, p. 162.
L.A. Akopian et al., "Slianie perlitowogo peska na formirowanie polivinilazetata polymerisazionnom napolnenie", Arm. Chim. F-1, Bd. 36, No. 4, pp. 262-264.
Hans-Georg Elias, Makromolekuele, 5$^{th}$ Edition, vol. 2, pp. 93-101, New York, (1992).
Ullmanns Encyklopaedie der technischen Chemie 4$^{th}$ Edition, vol. 19, pp. 132-145, Verlag Chemie (1980).
Bartl et al., Makromolekulare Stoffe, vol. E20, pp. 218-268, New York (1987).
L.A. Akopian et al., "Slianie perlitowogo peska na formirowanie polivinilazetata polymerisazionnom napolnenie", Arm. Chim. F-I, Bd. 36, No. 4, pp. 262-264. (1983).
PQ Corporation , "Silicate Powders & Sodium Metasllicates Specification", at www.pqcorp.com/productlines/SilicaPowdersSpecs.asp, pp. 1-4.
Cabot Corporation Product Data Sheet No. 171, "Untreated Fumed Silica CAB-O-SIL® M-5P" (2006).
C-E Minnerals, "TECO-SIL® Fused Silica/EMC" Product Data, found at www.ceminerals.com.

* cited by examiner

Primary Examiner—William K Cheung
(74) Attorney, Agent, or Firm—Steven C. Bauman; James E. Piotrowski

(57) ABSTRACT

A filler-containing an organic polymer dispersion is provided. The organic polymer of the dispersion is polymerized in the presence of particles of at least one filler. The ratio of the particle size of the filler particles to the particle size of the polymer particles is in the range of from 1.1:1 to 20:1.

20 Claims, No Drawings

FILLER-CONTAINING POLYMER DISPERSION, METHOD FOR ITS PRODUCTION AND USE

CROSS REFERENCE TO RELATED APPLICATIONS

This application is a Divisional Application of U.S. Ser. No. 09/869,467, filed Jun. 28, 2001, which is a national stage application under 35 U.S.C. §371 of International Application PCT/EP99/10151, filed Dec.21, 1999 claiming priority under 35 U.S.C. § 199 to CL 3177/98 filed Dec. 30,1998 and DE 199 03 801.5 filed Feb. 2,1999, the entire contents of each application incorporated herein by reference.

This invention relates to a filler-containing polymer dispersion which contains organic or inorganic filler particles and particles of at least one synthetic organic polymer, the ratio of the particle size of the filler particles to the particle size of the polymer particles being in the range from 1.1:1 to 20:1.

BACKGROUND OF THE INVENTION.

Polymer particles with a diameter of about 0.01 to about 30 μm play an important role in many areas of plastics technology. Adhesives or coating compositions containing polymer particles with diameters in this range are frequently used in particular for bonding articles or for coating surfaces. Examples of the range of applications include decorative surface coating in the form of paint coatings or other coatings and the bonding of two surfaces having identical or different properties with adhesives of the type frequently encountered in the field of bonding.

The polymer particles mentioned are generally produced by polymerization of olefinically unsaturated monomers of which the properties can be modified by the polymerization of mixtures of various monomers, for example by co- or terpolymerization. The modified properties of a single polymer particle are generally transferred as a collective property to a surface coating or bond prepared with the aid of such polymer particles. Collective properties which are often subjected to an application-related modification include, for example, hardness, elasticity and—above all in adhesive applications—bond strength, open time or early adhesion.

Certain properties of the composition used to prepare the coating or the bond, for example the surface coating composition or the adhesive, are just as important. In this connection, viscosity, flow behavior or residual monomer content are often modified in dependence upon the desired application.

Inorganic or organic fillers are often added to a surface coating composition or an adhesive containing polymer particles to modify the above-mentioned properties of a surface coating or a bond. Inorganic fillers reduce the level of organic polymer material in the coating and thus contribute to greater hardness of the coating and to protection of the environment and raw materials through a lower content of organic polymers. Organic fillers are capable of imparting certain combined properties of the filler and polymer particles present therein, for example to a polymer dispersion.

Whereas mixtures of polymer particles and fillers frequently lead to dull, rough surfaces in the field of surface coating, their effect in adhesives is often that the strength and elasticity of adhesive bonds are greatly reduced. In addition, the presence of fillers in polymer dispersions often contributes to a reduction in early adhesive strength.

Such effects are drastically noticeable above all in the field of high-quality applications of surface coatings and bonds, such as high-gloss paints and bonds in the paper or furniture industry. For example, a significant reduction in ultimate adhesive strength on wood is often observed, accompanied by reduced early adhesion.

EP-A 0 392 065 relates to polymer-coated filler particles where a filler core is coated with a membrane of a hydrophobic polymer. To produce these polymer-coated particles, a monomer is polymerized in aqueous dispersion in the presence of filler particles and an amphiphilic polymer. The document in question does not contain any teaching on the production of filler-containing polymer dispersions in which the filler particles and the polymer particles are present substantially alongside one another.

DE-OS 22 43 687 relates to an adhesive, more particularly for the production of corrugated cardboard. Although this document does describe a polymer dispersion in which polymer particles and mineral particles are present together and does indicate size ranges for the particular particles, it does not contain any teaching as to the particle size ratio along the lines of the present specification.

Accordingly, the problem addressed by the present invention was to overcome the above-mentioned disadvantages of the mixtures of polymer particles and fillers known from the prior art. More particularly, the problem addressed by the present invention was to provide a filler-containing polymer dispersion which would have the advantages of the mixtures of polymer particles and fillers known from the prior art without any of their known disadvantages.

Accordingly, a particular problem addressed by the present invention was to provide a filler-containing polymer dispersion which could be used for the production of high-quality surface coatings or bonds.

Another problem addressed by the invention was to provide a filler-containing polymer dispersion which could be used as a high-strength adhesive, particularly on wood.

A further problem addressed by the invention was to provide a filler-containing polymer dispersion with a low residual monomer content.

Yet another problem addressed by the invention was to provide an adhesive which would have an adequate open time, high early adhesion and a low viscosity coupled with excellent flow behavior.

A final problem addressed by the invention was to provide a process for the production of such filler-containing polymer dispersions.

BRIEF DESCRIPTION OF THE INVENTION.

The problems stated above are solved by a filler-containing polymer dispersion which contains organic or inorganic filler particles and particles of at least one synthetic organic polymer polymerized in the presence of the filler particles, the ratio of the particle diameter of the filler particles to the particle diameter of the polymer particles being in the range from 1.1:1 to 20:1.

Accordingly, the present invention relates to a filler-containing polymer dispersion which contains water, particles of at least one organic or at least one inorganic filler or a mixture thereof (filler particles) and particles of at least one synthetic organic polymer polymerized in the presence of filler particles of at least one type (polymer particles), characterized in that the ratio of the particle size of the filler particles to the particle size of the polymer particles is in the range from 1.1:1 to 20:1.

It has been found that surface coating compositions and surface coatings, adhesives and adhesive bonds at least comparable with filler-free coatings, but superior to the filler-containing systems known from the prior art in regard to open time, bond strength and early adhesion can be obtained using the polymer dispersions according to the invention. In addition, the filler-containing polymer dispersions according to the invention generally have a lower viscosity and better flow behavior than the system known from the prior art with comparable polymer contents and filler contents.

A process according to the invention for the production of the filler-containing polymer dispersions is also distinguished from the polymerization processes known from the prior art by the fact that it shortens the polymerization time in relation to comparable systems, provides for easier temperature control and leads to polymer dispersions with a reduced content of residual monomers in relation to polymer dispersions produced by polymerization processes known from the prior art.

Accordingly, the present invention relates to a filler-containing polymer dispersion which contains water, particles of an organic or inorganic filler (filler particles) or of a mixture of two or more organic or inorganic fillers or a mixture of two or more thereof and particles of at least one synthetic organic polymer polymerized in the presence of the filler or the fillers (polymer particles), the ratio of the particle size of the filler particles to the particle size of the polymer particles being in the range from 1.1:1 to 20:1.

Accordingly, the polymer dispersion according to the invention contains either inorganic filler particles of one type or organic filler particles of one type or inorganic filler particles of two or more different types or organic filler particles of two or more different types or organic filler particles of one type and organic filler particles of two or more different types or organic filler particles of one type and inorganic filler particles of two or more different types or inorganic filler particles of two or more different types and organic filler particles of two or more different types.

DETAILED DESCRIPTION OF THE INVENTION.

So far as organic polymer particles in the dispersion according to the invention are concerned, the organic filler particles and the (likewise organic) polymer particles differ to the extent that the organic polymer particles are formed in the presence of the filler particles, i.e. the polymerization of the polymer particles takes place in the presence of the filler particles. The effect according to the invention is obtained even when the organic filler particles and the polymer particles have substantially the same monomer composition. In one preferred embodiment of the invention, however, the organic filler particles and the polymer particles have different monomer compositions.

In the context of the invention, the term "particle size" is understood to be the "d50" value, i.e. the value at which about 50% of the particles have a smaller diameter and about 50% of the particles have a larger diameter. In principle, this value may be determined by any particle measuring techniques, for example measuring techniques based on the principle of light diffraction. The particle size data appearing in the present specification were obtained with a MASTERSIZER X from Malvern Instruments, Herrsching, Germany (version 1.2b). The mode of operation of this instrument is based on the diffraction of a light beam, the particle size being correlated with the diffraction angle.

Other techniques for determining particle sizes include, for example, granulometry in which a uniform suspension of a small quantity of the powder to be investigated is prepared in a suitable dispersion medium and is then exposed to sedimentation. The percentage distribution of the particle sizes can be estimated from the correlation between size and density of the spherical particles and their sedimentation rate as determined by Stokes' law and the sedimentation time. Other methods for determining particle size include microscopy, electron microscopy, sieve analysis, sedimentation analysis, determination of the surface density and the like.

"Polymer particles" in the context of the present invention are understood to be dispersed particles of a substantially water-insoluble synthetic organic polymer polymerized in the presence of an inorganic or organic filler particle or a mixture of two or more such filler particles, as described above.

According to the invention, suitable filler particles are any organic or inorganic particles which have a particle size (as defined above) of about 0.033 to about 10 μm, for example about 0.05 to about 5 μm or about 0.1 to about 4 μm or 0.2 to about 3 μm or about 0.5 to about 1.0 μm. According to the invention, particle size classification is based on the size of the primary particles.

A "primary particle" in the context of the present invention is understood to be a particle which is held together by primary ionic or covalent forces, for example in the form of a crystal lattice. In contrast to the primary particles, "secondary particles" are understood to be agglomerates of two or more primary particles which adhere to one another at the outer surfaces or boundaries of the primary particles under the effect of weak ionic forces or other polarity-based forces and which can be broken up into the primary particles with minimal energy, for example by simple mechanical dispersion and/or by addition of a dispersant which breaks up the particles by eliminating or reducing the weak binding forces between the primary particles.

Filler particles suitable for the purposes of the invention are, for example, inorganic materials which are inert to the at least one organic polymer and during the production of the filler-containing polymer dispersion under the prevailing reaction conditions. Examples of suitable inorganic materials are aluminium silicates, for example andalusite, sillimanite, kyanite, mullite, pyrophyllite or imogolite. Also suitable are compounds based on sodium aluminium or calcium silicates. Other suitable inorganic materials are minerals, such as silica, silica flour, silica gel, barium sulfate, metal oxides, such as zinc oxide, titanium dioxide, zeolites, kaophilite, leucite, potash feldspar, biotite, the group of soro-, cyclo-, ino-, phyllo- and tecto-silicates, the group of soluble or poorly soluble sulfates, such as gypsum, anhydrite or heavy spar, and calcium minerals, such as talcum or chalk ($CaCO_3$). The inorganic materials mentioned may be used individually, i.e. as filler particles of a single type, for the purposes of the present invention. However, a mixture of two or more types of the filler particles mentioned may equally well be used.

Other filler particles suitable for the purposes of the invention are organic filler particles in the presence of which the polymerization of the polymer particles may take place. Suitable organic filler particles are, for example, polyvinyl acetate and copolymers of polyvinyl acetate with one or more polymerizable compounds, polystyrene, polyethylene, polypropylene, waxes, such as polyethylene wax, polybutylene, polybutadiene, copolymers of butadiene and styrene, polyacrylonitrile, resins, such as rosin or hydrocarbon resins, polyacrylate esters or polymethacrylate esters with linear or branched aliphatic, aromatic or cycloaliphatic alcohols, such as methanol, ethanol, propanol, isopropanol, the isomeric butanols and higher homologs of the alcohols mentioned containing up to about 22 carbon atoms, cyclohexanol, benzyl alcohol and the like, polydialkyl maleates, such as dibutyl maleate and copolymers thereof or polymers containing silyl groups, such as polyvinyl silanes or copolymers of vinyl silane with one or more of the monomers mentioned.

In one preferred embodiment of the invention, the organic filler particles contain as organic filler filler particles containing polyvinyl acetate or copolymers of polyvinyl acetate with one or more polymerizable compounds, polystyrene, polyethylene, polypropylene, waxes, polybutylene, polybutadiene, copolymers of butadiene and styrene, polyacrylonitrile, resins, polyacrylate esters or polymethacrylate esters or polymers containing silyl groups. In another preferred embodiment, the organic filler particles consist of the polymers mentioned.

In one preferred embodiment of the invention, the filler-containing polymer dispersion contains less than five different types of filler particles, for example four, three or two different types. In another embodiment of the present invention, the polymer dispersion according to the invention contains filler particles of only one type.

The filler particles usable in accordance with the present invention may have smooth, rough or porous surfaces. In one preferred embodiment, the filler particles have a rough surface or a porous surface.

In one preferred embodiment of the invention, the filler-containing polymer dispersions according to the invention contain particles of chalk ($CaCO_3$), gypsum ($CaSO_4$) as anhydrite, hemihydrate or dihydrate, silica flour, silica gel, titanium dioxide, silica flour, talcum or a layer silicate as filler.

In another preferred embodiment of the invention, the filler-containing dispersion according to the invention contains chalk ($CaCO_3$) or gypsum ($CaSO_4$) or a mixture of filler particles containing chalk and gypsum as the filler particles. In one particularly preferred embodiment, chalk particles are present as the filler particles.

The filler-containing polymer dispersion contains polymer particles consisting of an organic polymer or of a mixture of two or more organic polymers.

Suitable organic polymers are any organic polymers obtainable by radical polymerization of olefinically unsaturated and radical-polymerizable monomers.

Olefinically unsaturated monomers accessible to emulsion polymerization are particularly suitable for the production of the polymer particles. Suitable polymers are, for example, vinyl ester polymers of which the basic monomeric unit is a vinyl ester of a linear or branched carboxylic acid containing about 2 to about 10 carbon atoms.

The vinyl ester polymers are used not only as homopolymers or copolymers of vinyl ester monomers; in another embodiment of the invention, a copolymer of vinyl acetate and ethylene (EVA copolymer) is used as the organic polymer.

Other suitable organic polymers emanate from the group of styrene/butadiene rubbers (SBRs). Rubbers such as these are produced by copolymerization of styrene and butadiene and generally contain the two monomers in a ratio by weight of about 23.5:76.5 or about 40:60. The SBRs are normally produced by emulsion polymerization in water.

Another suitable group of polymers are the polyvinyl acetates (PVAC). Polyvinyl acetates are thermoplastic polymers of vinyl acetate. The polymerization is generally carried out by suspension or emulsion polymerization.

Another suitable group of polymers are the polyethylene homo- and copolymers. A radical polymerization of ethylene is carried out, for example, in the high-pressure polymerization to LDPE under pressures of about 1,400 to 3,500 bar and at temperatures of 150 to 350° C. The reaction is initiated by oxygen or peroxides. Suitable comonomers are linear or branched α,β-unsaturated olefins.

Another group of suitable polymers are the polyacrylates or the polymethacrylates or the copolymers of acrylates and methacrylates thereof. The polymers mentioned may optionally have a free acid content which corresponds to 20—25 ml of 0.1 N KOH solution.

Another suitable polymer is polyvinylidene chloride. The polymer is preferably obtained by emulsion polymerization of 1,1-dichloroethylene. Copolymers of 1,1-dichloroethylene with acrylates, methacrylates, vinyl chloride or acrylonitrile are particularly suitable.

Another suitable polymer is polyvinylidene fluoride. This polymer may be obtained by polymerization of vinylidene fluoride and may be adapted in regard to chemical and mechanical properties, for example by copolymerization with suitable monomers, such as ethylene, acrylonitrile, acrylate esters, methacrylate esters and the like.

The polyvinyl chlorides obtainable by suspension polymerization (SPVC), micro-suspension polymerization or emulsion polymerization (EPVC) are also suitable.

According to the invention, the polymers mentioned may be present in the filler-containing polymer dispersion according to the invention both individually and in the form of mixtures of two or more thereof.

In another preferred embodiment of the invention, the filler-containing polymer dispersion contains polyvinyl acetate or polyacrylate, more particularly polybutyl acrylate, or a mixture of polyvinyl acetate and polyacrylate as polymer particles.

Depending on the properties the polymer particles are required to show and on the method used for their production, the percentage content of filler in the polymer dispersion as a whole may be between about 5 and about 55% by weight. In one preferred embodiment of the invention, the percentage content is between about 5 and about 50% by weight, for example between about 10 and about 35% by weight. In other preferred embodiment, the content of filler particles may be about 15, 20, 25 or 30% by weight or may assume an intermediate value.

The filler-containing polymer dispersion according to the invention may optionally contain at least one water-soluble organic polymer with a molecular weight of more than about 600 and an HLB value of at least 15, for example more than about 16 or more than about 17 or more than about 18. This is preferred particularly when at least partly inorganic filler particles are present as filler particles in the polymer dispersion according to the invention.

A compound suitable as a water-soluble organic polymer is, for example, polyvinyl alcohol which may be up to about 99% hydrolyzed, for example between about 70 and about 95% or between about 80 and about 88% hydrolyzed, the acetic acid groups of the chain being replaced by OH groups which are preferably distributed statistically over the entire polymer chain.

The polyvinyl alcohol preferably has a degree of polymerization of more than 100 and, more particularly, more than about 2,000. Particularly good results can be obtained, for example, with polyvinyl alcohol having a degree of polymerization of about 1,000 to about 2,000.

The polyvinyl alcohol preferably has an HLB value of at least about 19 or at least about 20, for example about 21 to about 26, for example about 22 to about 24.

Suitable polyvinyl alcohols are obtainable from Clariant, for example under the names of Mowiwol 40/88, Mowiwol 26/88, Mowiwol 8/88 or Mowiwol 4/88.

Other water-soluble organic polymers suitable for use in accordance with the invention consist, for example, of the cellulose ethers, carboxymethyl celluloses, hydroxyethyl celluloses, casein, sodium or potassium alginates, polyurethanes, etc.

In another embodiment of the invention, the ratio of the mean specific surface of organic polymers to organic or inorganic filler particles is about 5:1. The total specific surface corresponding to the inorganic fillers, based on the organic water-soluble polymers, in the dispersion according to the invention is about 5% to about 35% of the total surface of the dispersion.

In another embodiment of the invention, the fillers increase the mean total specific surface of the dispersion.

In another preferred embodiment of the invention, the filler-containing polymer dispersion contains at least one ionic surfactant with an HLB value of 1 to 10. In one preferred embodiment of the invention, the ionic surfactant has a molecular weight of less than about 600.

Anionic, cationic or ampholytic surfactants or mixtures of two or more thereof may be present. Examples of suitable anionic surfactants are alkyl sulfates, more particularly those with a chain length of about 8 to about 18 carbon atoms, alkyl and alkaryl ether sulfates containing about 8 to about 18 carbon atoms in the hydrophobic part and 1 to about 10 ethylene oxide (EO) or propylene oxide (PO) units or mixtures thereof in the hydrophilic part of the molecule, sulfonates, more particularly alkyl sulfonates, containing about 8 to about 18 carbon atoms, alkylaryl sulfonates containing about 8 to about 18 carbon atoms, taurides, esters and semiesters of sulfosuccinic acid with monohydric alcohols or alkylphenols containing 4 to about 15 carbon atoms, which may optionally be ethoxylated with 1 to about 20 EO units, alkali metal and ammonium salts of carboxylic acids, for example of fatty acids or resin acids containing about 8 to about 32 carbon atoms or mixtures thereof, phosphoric acid partial esters and alkali metal and ammonium salts thereof.

In one preferred embodiment of the invention, alkyl or alkaryl phosphates or alkyl or alkaryl sulfates containing about 8 to about 22 carbon atoms in the organic moiety, alkyl ether or alkaryl ether phosphates or alkyl ether or alkaryl ether sulfates containing about 8 to about 22 carbon atoms in the alkyl or alkaryl moiety and 1 to about 10 EO units or a mixture of two or more thereof are used as anionic surfactants.

In another preferred embodiment, an alkyl or alkaryl sulfate containing about 8 to about 22 carbon atoms in the organic moiety or an alkyl ether or alkaryl ether sulfate containing about 8 to about 22 carbon atoms in the alkyl or alkaryl moiety and 1 to about 10 EO units or a mixture of two or more thereof is used as anionic surfactant.

Examples of cationic surfactants are salts of primary, secondary or tertiary fatty amines containing about 8 to about 24 carbon atoms with acetic acid, sulfuric acid, hydrochloric acid or phosphoric acids, quaternary alkyl and alkyl benzene ammonium salts, more particularly those of which the alkyl groups contain about 6 to about 24 carbon atoms, more particularly the halides, sulfates, phosphates or acetates or mixtures of two or more thereof, alkyl pyridinium, alkyl imidazolinium or alkyl oxazolidinium salts, more particularly those of which the alkyl chain contains up to about 18 carbon atoms, for example the halides, sulfates, phosphates or acetates or mixtures of two or more thereof.

Examples of ampholytic surfactants are long-chain substituted amino acids, such as N-alkyl di(aminoethyl)glycine or N-alkyl-2-aminopropionic acid salts, betaines, such as N-(3-acylamidopropyl)-N,N-dimethyl ammonium salts with a $C_{8-18}$ acyl group or alkyl imidazolium betaines.

In one preferred embodiment of the present invention, the following anionic surfactants are used: the alkali metal salts, more particularly the Na salt, of $C_{12/14}$ fatty alcohol ether sulfates, alkyl phenyl ether sulfates, more particularly the alkali metal or $NH_4$ salts thereof, Na-n-dodecyl sulfate, di-Koleic acid sulfonate $(C_{18})$, Na-n-alkyl-$(C_{10}C_{13})$-benzene sulfonate, Na-2-ethyl hexyl sulfate, $NH_4$ lauryl sulfate $(C_{8/14})$, Na lauryl sulfate $(C_{12/14})$, Na lauryl sulfate $(C_{12/16})$, Na lauryl sulfate $(C_{12/18})$, Na cetyl stearyl sulfate $(C_{16/18})$, Na oleyl cetyl sulfate $(C_{16/18})$, sulfosuccinic acid monoester disodium salt, fatty alcohol sulfosuccinate disodium salt, dialkylsulfosuccinate sodium salt or disodium sulfosuccinate or mixtures of two or more thereof.

If the polymer dispersion according to the invention contains ionic surfactants, they are present in a preferred embodiment of the invention in a quantity of up to about 1% by weight or less, for example in a quantity of up to about 0.8% by weight or about 0.5% by weight or less, based on the dispersion as a whole. Smaller quantities of ionic surfactant, for example up to about 0.2% by weight or less, for example about 0.1% by weight, 0.05% by weight or 0.02% by weight, may also be present. In another preferred embodiment of the invention, the ratio of ionic surfactant to organic water-soluble polymer is about 0.1% to about 3.0%.

In another preferred embodiment, the filler-containing polymer dispersion contains at least one nonionic surfactant with an HLB value of 13 to 20. In one preferred embodiment of the invention, the nonionic surfactant has a molecular weight of less than about 600.

Examples of nonionic surfactants are alkyl polyglycol ethers, preferably those containing about 8 to about 20 EO units and alkyl groups with about 8 to about 20 carbon atoms, alkylaryl polyglycol ethers, preferably those containing about 8 to about 40 EO units and about 8 to about 20 carbon atoms in the alkyl or aryl groups, ethylene oxide/propylene oxide (EO/PO) block copolymers, preferably those containing about 8 to about 40 EO units and the same number of PO units, addition products of alkyl amines containing alkyl groups with about 8 to about 22 carbon atoms with ethylene oxide or propylene oxide, fatty and resin acids containing about 6 to about 32 carbon atoms, alkyl polyglycosides with linear or branched, saturated or unsaturated alkyl groups containing on average about 8 to about 24 carbon atoms and an oligoglycoside group containing about 1 to about 10 hexose or pentose units on average or mixtures of two or more thereof, natural substances and derivatives thereof, such as lecithin, lanolin or sarcosine, linear organo(poly)siloxanes containing polar groups, more particularly those containing alkoxy groups with up to about 10 carbon atoms and up to about 20 EO or PO groups.

In one preferred embodiment of the invention, the polymer dispersion according to the invention contains, for example, nonyl phenol ethoxylates, octyl phenol ethoxylates, $C_{12/14}$ fatty alcohol ethoxylates, oleyl cetyl ethoxylates, $C_{16/18}$ fatty alcohol ethoxylates, cetyl stearyl ethoxylates, ethoxylated triglycerides, sorbitan monolaurate, sorbitan monooleate, sorbitan-20EO-monooleate, sorbitan-20EO-monostearate or a mixture of two or more thereof as nonionic surfactant.

If the polymer dispersion according to the invention contains nonionic surfactants, they are present in a preferred embodiment of the invention in a quantity of up to about 1% by weight or less, for example up to about 0.8% by weight or about 0.5% by weight or less, based on the dispersion as a whole. Small quantities of nonionic surfactant, for example up to about 0.2% by weight or less, for example about 0.1% by weight, 0.05% by weight or 0.02% by weight, may also be present. In another preferred embodiment, the ratio of nonionic surfactant(s) to organic water-soluble polymers (based on weight) is about 0.01 to about 1.0%. The ratio of nonionic surfactant(s) to anionic surfactant(s) (based on weight) in one preferred embodiment of the invention is about 5:1 to about 1:5, for example about 3:1 to about 1:3 or about 2:1 to about 1:2. In another preferred embodiment of the invention, the ratio by weight of nonionic surfactant to anionic surfactant is about 1.2:1 to about 1:1.2 or about 1:1.

In another preferred embodiment of the invention, the dispersion contains up to about 30% by weight, based on the dispersion as a whole, of additives. The additives include, for example, stabilizers, defoamers, antioxidants, photostabilizers, pigment dispersants, fillers, pH adjusters, plasticizers and the like.

Suitable plasticizers are, for example, esters, such as abietic acid ester, adipic acid ester, azelaic acid ester, benzoic acid ester, butyric acid ester, acetic acid ester, esters of higher fatty acids containing about 8 to about 44 carbon atoms, esters of OH-functional or epoxidized fatty acids, fatty acid esters and fats, glycolic acid esters, phosphoric acid esters, phthalic acid esters, linear or branched alcohols containing 1 to 12 carbon atoms, propionic acid esters, sebacic acid esters, sulfonic acid esters, thiobutyric acid esters, trimellitic acid esters, citric acid esters and mixtures of two or more thereof. The asymmetrical esters of dibasic aliphatic dicarboxylic acids, for example the esterification product of adipic acid monooctyl ester with 2-ethyl hexanol (Edenol DOA, a product of Henkel KGaA, Düsseldorf), are particularly suitable.

Other suitable plasticizers are the pure or mixed ethers of monohydric, linear or branched $C_{4-16}$ alcohols or mixtures of two or more different ethers of such alcohols, for example dioctyl ethers (obtainable as Cetiol OE from Henkel KGaA, Düsseldorf).

In another preferred embodiment, end-capped polyethylene glycols, for example polyethylene or polypropylene glycol di-$C_{1-4}$-alkyl ethers, more particularly the dimethyl or diethyl ethers of diethylene glycol or dipropylene glycol and mixtures of two or more thereof, are used as plasticizers.

If it is to be used as an adhesive, the dispersion according to the invention may contain up to about 10% by weight of typical tackifiers. Suitable tackifiers are, for example, resins, terpene oligomers, coumarone/indene resins, aliphatic petrochemical resins and modified phenolic resins.

The dispersion according to the invention may contain up to about 2% by weight and preferably about 1% by weight of UV stabilizers. Particularly suitable UV stabilizers are the so-called hindered amine light stabilizers (HALS).

In another preferred embodiment of the invention, the filler-containing polymer dispersion contains about
10 to 70% by weight of an organic polymer in the form of polymer particles,
5 to 55% by weight of filler particles,
0.05 to 0.5% by weight of a nonionic surfactant with an HLB value of 13 to 20,
0.01 to 0.1% by weight of an ionic surfactant with an HLB value of 1 to 10,
0.05 to 10% by weight of a water-soluble organic polymer with a molecular weight of more than 600 and an HLB value of more than 15 where inorganic filler particles are present in the polymer dispersion.
24.89 to 84.89% by weight of water and
0 to 30% by weight of other additives.

If the polymer dispersion according to the invention contains only organic filler particles, a water-soluble organic polymer with a molecular weight of more than 600 and an HLB value of more than 15 may nevertheless be present in the dispersion together with the corresponding other compounds. However, if only organic fillers are present, it is not absolutely essential to use a water-soluble organic polymer in order to obtain the effect according to the invention. If a water-soluble organic polymer with a molecular weight of more than 600 and an HLB value of more than 15 is to be used together with an organic filler or a mixture of two or more organic fillers, the quantity of water-soluble organic polymer with a molecular weight of more than 600 and an HLB value of more than 15 used will generally be smaller than it would for a comparable quantity of inorganic filler.

In one preferred embodiment of the present invention, the filler-containing polymer dispersion is prepared by emulsion polymerization. In the context of the present invention, "emulsion polymerization" is understood to be a polymerization process in which monomers insoluble or poorly soluble in water are emulsified in water using emulsifiers and polymerized using water-soluble initiators. Suitable emulsion polymerization processes are described, for example, in Comprehensive Polymer Chemistry, 4, 171–218, Elias (5th Edition), 2, 93 et seq; in Encyclopaedia of Polymer Science and Engineering, 12, 512 et seq and in Encyclopaedia of Polymer Science and Technology, 5, 801 et seq. Other suitable references are known, for example, from the reference books known to the expert Ullmann's Enzyklopadie der technischen Chemie, Houben-Weyl (E20, 218–268) or Kirk-Othmer. Reference is hereby expressly made to the cited literature references, the disclosures of those references being regarded as part of the disclosure of the present specification.

Whereas the filler-containing polymer dispersions known from the prior art generally involve addition of the filler to the prepared polymer dispersion, the filler particles are present in the form of their primary particles in a dispersion before the beginning of polymerization of the monomers in the case of the process according to the invention.

In one preferred embodiment of the present invention, the dispersion of the filler particles is carried out in such a way that any agglomerates of filler particles present are separated at least substantially, i.e. to a level of at least about 80 or 90% by weight, into their primary particles. This separation into the primary particles is generally promoted by the presence of emulsifiers or dispersants, as used in emulsion or suspension polymerization. However, any other form of separation of any filler particle agglomerates into the primary particles is also possible in the context of the process according to the invention, including for example ultrasonic deagglomeration, flotation or electrokinetic techniques.

According to the invention, the filler-containing polymer dispersion is prepared by emulsion polymerization. To this end, a dispersion of the filler particles in water is preferably first produced. For example, an aqueous solution of an ionic surfactant is first prepared, the ionic surfactant used preferably being the surfactant which, subsequently, is also used in the emulsion polymerization.

In another preferred embodiment of the invention, an aqueous solution of an organic water-soluble polymer with a molecular weight of at least about 600 and an HLB value of at least about 15 is first prepared.

In another preferred embodiment of the invention, an aqueous solution containing both an ionic surfactant and a water-soluble polymer with a molecular weight of at least about 600 and an HLB value of at least about 15 may also first be prepared.

After the preparation of the solutions mentioned, the dispersion of the filler particles is prepared in a preferred embodiment of the present invention. To this end, the filler particles are dispersed in one of the above-mentioned solutions, the dispersion being stirred until any filler agglomerates present have been largely dispersed. In cases of doubt, for example where a new filler on which no experimental data are available is used, the dispersion of the filler particles and the dispersion of any agglomerates present may simply be followed by several successive measurements of the particle size distribution during the dispersion process. Separation into the primary particles is achieved when the particle size distribution differs only slightly, if at all, in two successive measurements. The dispersion of the agglomerates may optionally be influenced by influencing the temperature, the stirring speed or the emulsifier or mixture of two or more emulsifiers used. The effects of the proposed measures may readily be monitored and optimized for individual cases by measurement of the particle size distribution.

When a suitable dispersion of filler particles is present, the emulsion polymerization is continued. This is done, for example, by dissolving a polymerization initiator in the dispersion, heating the dispersion to a suitable temperature and then starting the polymerization reaction by dropwise addition of monomers. However, this procedure may also be replaced by any other procedure by which the emulsion polymerization can be carried out in the filler particle dispersion.

In another preferred embodiment of the invention, a preliminary emulsion containing the monomers or the monomer mixture and the filler dispersion may also be prepared by the procedure described above. This preliminary emulsion, which may optionally contain a polymerization initiator, may be added dropwise or in portions at a temperature suitable for the polymerization reaction.

Accordingly, the present invention also relates to a process for the production of a filler-containing polymer dispersion, in which at least one radical-polymerizable monomer is subjected to emulsion polymerization in aqueous phase using a polymerization initiator, the aqueous phase containing filler particles of at least one dispersed filler with a particle size (d50) of 0.01 to 0.5 µm, at least one water-soluble organic polymer with a molecular weight of more than 600 and an HLB value of more than 15 and at least one ionic surfactant. Suitable ionic surfactants are any of those listed in the foregoing.

In one preferred embodiment of the invention, the aqueous phase additionally contains a nonionic surfactant, suitable nonionic surfactants having already been described in the foregoing.

In another preferred embodiment of the invention, a water-soluble polymerization initiator, more particularly a peroxo compound of an organic or inorganic acid, is used in the process for producing the polymer dispersion according to the invention.

Suitable polymerization initiators are water-soluble initiators, such as tert.butyl hydroperoxide, sodium peroxodisulfate, peroxodisulfuric acid, cumene hydroperoxide, hydrogen peroxide, sodium or potassium percarbonate; azo compounds, such as diazoisobutyrodinitrile or benzoyl peroxide. Redox initiators, i.e. systems consisting of oxidizing and reducing agents, are also suitable. In many cases, water-soluble redox initiators contain transition metals, for example Fe/HO (I), although other basic components, for example the systems peroxysulfates/metabisulfates, peroxysulfates/thiosulfates or peroxides/thiosulfates, may also be used.

In one preferred embodiment of the invention, sodium persulfate, potassium persulfate or ammonium persulfate is used as the polymerization initiator.

According to the invention, the quantity of polymerization initiator used is generally between about 0.01 and about 0.5% by weight, based on the dispersion as a whole. In one preferred embodiment of the invention, the total amount of polymerization initiator used is between about 0.03 and about 0.2% by weight, for example between about 0.05 and about 0.15% by weight.

According to the invention, the total quantity of polymerization initiator may be present in the dispersion of the filler particles at the beginning of the polymerization process. In one preferred embodiment of the invention, however, the polymerization initiator is added in at least two batches at different stages of the polymerization reaction. For example, part of the total quantity of polymerization initiator may be added before the monomer(s), the remainder being added in portions or continuously during or after addition of the monomer(s).

In one preferred embodiment of the invention, the process according to the invention is carried out in at least two successive stages, a dispersion containing a) at least one ionic surfactant with an HLB value of 1 to 10 or a nonionic surfactant with an HLB value of 13 to 20 or a mixture of two or more thereof,
b) at least one inorganic filler with a particle size (d50) of 0.01 to 0.5 µm,
c) at least one polymerization initiator and
d) at least one water-soluble organic polymer with a molecular weight of more than 200 and an HLB value of more than 15 being prepared in a first stage and then heated to a temperature of 70 to 90° C. and e) at least one radical-polymerizable monomer being added and polymerized in a second stage.

In another preferred embodiment of the invention, the organic or inorganic filler particles or a mixture thereof are/is added before the polymerization initiator.

In another preferred embodiment of the process according to the invention, the organic filler or the inorganic filler or a mixture thereof is present substantially in the form of its primary particles before the polymerization.

The polymerization temperature applied in the process according to the invention depends upon the choice of the monomers used and the polymerization process applied. For the monomers from the group of acrylates and vinyl acetate used in accordance with the present invention, the polymerization temperature in one preferred embodiment of the invention is in the range from about 80 to 90° C.

The present invention also relates to the use of the filler-containing polymer dispersions in lacquers, emulsion paints, glues, adhesives, surface coating compositions or other surface coatings.

Accordingly, the present invention also relates to an adhesive or a surface coating composition containing a filler-containing polymer dispersion according to the invention or produced by the process according to the invention.

The invention is illustrated by the following Examples.

EXAMPLES

Production of a filler-containing polyvinyl acetate dispersion:
1.1 200 g of vinyl acetate monomer were introduced into a monomer container.
1.2 Preparation of the catalyst solution
 1.0 g of ammonium persulfate were dissolved in 3.0 g of water in a clean plastic container.
1.3 Preparation of a premix 592.3 g of water and 32.7 g of Vinol V-205 (manufacturer: Air Products, Kentucky) were introduced into a clean container. The mixture was stirred and then heated to about 85–90° C., followed by stirring until the components had completely dissolved (about 2 hours). The solution was then cooled.

1.4 0.37 g of sodium lauryl ether sulfate and 0.12 g of Tergitol 15S9 (manufacturer: Union Carbide Chemicals and Elastics (Europe) S.A.) were added. The mixture was homogenized for a few minutes, after which 100 g of chalk were added, the mixture being stirred for about 30 minutes in order to break up the chalk into its primary particles.

1.5 0.09 g of defoamer was added to this dispersion.

1.6 Polymerization:

The premix was then heated to 80° C. and 90% of the catalyst solution was added. The mixture was homogenized by stirring for 5 minutes.

1.7 The vinyl acetate monomer was then added and the polymerization process was started and lasted about 3.5 to 4.0 hours.

1.8 After the end product had been obtained, its physicochemical parameters and end use were investigated.

2. Residual monomer content:

A dispersion according to the invention was compared with a dispersion obtained simply by mixing a polyvinyl acetate dispersion with chalk. The two dispersions were otherwise identical in their composition. Both dispersions were gas-chromatographically analyzed for monomeric vinyl acetate. The investigations were carried out both by extraction and by the "head space method". The results are set out in Table 1.

TABLE 1

| Vinyl acetate content | | |
|---|---|---|
| Sample | Head space | Extraction |
| Comparison Example | 551 ppm | 872 |
| Invention | 28 | 27 |

3. Formulation Examples

Some Formulation Examples are set out in Table 2 below. The quantities shown represent units by weight.

TABLE 2

| Constituent | Example 1 | Example 2 | Example 3 |
|---|---|---|---|
| Water | 450 | 450 | 582 |
| SK1 | — | — | 14 |
| SK2 | 23.5 | 23.5 | 36 |
| SK3 | 23.5 | 23.5 | — |
| Nonionic surfactant | 0.4 | 0.4 | 0.4 |
| Anionic surfactant | 0.4 | 0.4 | 0.4 |
| Defoamer | 0.2 | 0.2 | 0.2 |
| Titanium dioxide | — | — | 90 |
| Chalk | 110 | 165 | — |
| Vinyl acetate | 390 | 335 | 260 |
| Ammonium persulfate | 1.3 | 1.3 | 1.3 |
| Total | 999.3 | 999.3 | 984.3 |
| Solids content | 55.33% | 55.84% | 41.32 |
| pH value | 6.5 | 6.65 | — |
| Viscosity (5/2/20) cps | 38,000 | 38,000 | 83,000 |

SK1=polyvinyl alcohol, partly saponified, degree of hydrolysis 87.2–88.8%, acetyl content 10–11.4%, degree of polymerization 900, viscosity 3.5–4.5 mPas (4% solution in water)

SK2=polyvinyl alcohol, partly saponified, degree of hydrolysis 86.7–88.7%, acetyl content 10–11.4%, ester value 130–150, pH 4.5–7 (4% solution in water), viscosity 24.5–27.5 mPas (4% solution in water)

SK3=polyvinyl alcohol, partly saponified, degree of hydrolysis 87.2–88.8%, acetyl content 10–11.4%, degree of polymerization 900, viscosity 3.5–4.5 mPas (4% solution in water)

Nonionic surfactant=$C_{1-15}$ alcohol+9 EO

Anionic surfactant=$C_{12-14}$ fatty alcohol+2 EO sulfate sodium salt

Defoamer=mixture of hydrocarbons and nonionic surfactants

The invention claimed is:

1. A filler-containing polymer dispersion, comprising water, particles of at least one filler selected from the group consisting of organic fillers, inorganic fillers and mixtures thereof, at least one water soluble organic polymer with a molecular weight of more than 600 and an HLB value of at least 15, and particles of at least one synthetic organic polymer, polymerized in the presence of at least one type of the filler particles, wherein the dispersion has a ratio of filler particle size to synthetic organic polymer particle size of 1.1:1 to 20:1 and wherein the synthetic organic polymer particles have a diameter (d50) of 0.03 to 0.5 μm.

2. The filler-containing polymer dispersion as claimed in claim 1, wherein the inorganic filler comprises a member selected from the group consisting of chalk ($CaCO_3$), gypsum ($CaSO_4$) as anhydrite, hemihydrate or dihydrate, silica flour, silica gel, titanium dioxide, talcum, a layer silicate, barium sulfate, barite and mixtures thereof and wherein the organic filler comprises a member selected from the group consisting of polyvinyl acetate, vinyl acetate copolymers, polystyrene, polyethylene, polypropylene, waxes, polybutylene, polybutadiene, copolymers of butadiene and styrene, polyacrylonitrile, resins, polyacrylate esters, polymethacrylate esters polymers containing silyl groups and mixtures thereof.

3. The filler-containing polymer dispersion as claimed in claim 1, wherein the at least one water-soluble polymer comprises a member selected from the group consisting of polyvinyl alcohol, cellulose ethers, carboxymethyl celluloses, hydroxyethyl celluloses, casein, potassium alginate, sodium alginate, polyurethanes and mixtures thereof.

4. The filler-containing polymer dispersion as claimed in claim 1, wherein the dispersion comprises at least one ionic surfactant with an HLB value of 1 to 10.

5. The tiller-containing polymer dispersion as claimed in claim 1 wherein the dispersion comprises at least one nonionic surfactant with an HLB value of 13 to 20.

6. The filler-containing polymer dispersion as claimed in claim 1 comprising:
   a) 10% to 70% by weight of a water-insoluble organic polymer;
   b) 5% to 55% by weight of filler particles;
   c) 0.02% to 1.0% by weight of a nonionic surfactant with an HLB value of 13 to 20;
   d) 0.01% to 1.0% by weight of an ionic surfactant with an HLB value of 1 to 10;
   e) 0.05% to 10% by weight of the water-soluble organic polymer with a molecular weight of more than 600 and an HLB value of more than 15;
   f) 24.92% to 84.89% by weight of water and
   g) 0 to 30% by weight of additives.

7. The process for the production of a filler-containing polymer dispersion, which comprises: emulsion polymerizing at least one radical-polymerizable monomer in an aqueous phase using a polymerization initiator, the aqueous phase containing filler particles of at least one dispersed filler with a particle size (d50) of 0.01 to 0.51 μm and at least one water-soluble organic polymer with a molecular weight of more than 600 and an HLB value of more than 15 whereby a dispersion comprising filler particles and polymer particles having a diameter (d50) of 0.03 to 0.5 µm is formed.

8. The process as claimed in claim 7, wherein the aqueous phase contains an ionic surfactant.

9. The process as claimed in claim 7, wherein the aqueous phase contains a nonionic surfactant.

10. The process as claimed in claim 7, wherein the polymerization initiator is water-soluble.

11. The process as claimed in claim 7, wherein the process is carried out in at least two successive stages comprising:
  a) a first stage comprising preparing a dispersion containing:
    1) at least one ionic surfactant with an HLB value of 1 to 10 or a nonionic surfactant with an HLB value of 13 to 20 or a mixture of two or more thereof,
    2) at least one inorganic filler with a particle size (d50) of 0.01 to 0.5 µm,
    3) at least one polymerization initiator and
    4) at least one water-soluble organic polymer with a molecular weight of more than 600 and an HLB value of more than 15 and then heating the dispersion to a temperature of 70 to 90° C.; and
  b) a second stage comprising adding and polymerizing at least one radical-polymerizable monomer in the dispersion prepared in the first stage.

12. The process as claimed in claim 11 wherein the inorganic filler particles are added before the polymerization initiator.

13. The process as claimed in claim 7, wherein the filler particles dispersed in the aqueous phase are pre-emulsified with one or more monomers.

14. The process as claimed in claim 13, wherein the polymerization initiators are added in portions to the dispersion.

15. The filler-containing polymer dispersion, produced by the process claimed in claim 7.

16. An adhesive or surface coating composition, comprising at least one filler-containing polymer dispersion of claim 1.

17. The adhesive or surface coating composition produced by the process of claim 7.

18. The filler-containing polymer dispersion of claim 1 containing at least one nonionic surfactant with an HLB of 13 to 20 and an ionic surfactant with an HLB of 1 to 10 wherein a ratio by weight of nonionic surfactant to ionic surfactant is from about 5:1 to about 1:5.

19. An adhesive or surface coating composition comprising: water; particles of at least one filler selected from the group consisting of organic fillers, inorganic fillers and mixtures thereof; at least one water soluble organic polymer with a molecular weight of more than 600 and an HLB value of at least 15; and synthetic organic polymer particles polymerized in the presence of at least one type of the filler particles, the synthetic organic polymer particles having a diameter (d50) of 0.03 to 0.5 µm; wherein the dispersion has a ratio of filler particle size to synthetic organic polymer particle size of 1.1:1 to 20:1.

20. The adhesive or surface coating composition of claim 19, wherein the inorganic filler comprises a member selected from the group consisting of $CaCO_3$, $CaSO_4$ as anhydrite, hemihydrate or dihydrate, silica flour, silica gel, titanium dioxide, talcum, barium sulfate, barite and mixtures thereof and wherein the organic filler comprises a member selected from the group consisting of polyvinyl acetate vinyl acetate copolymers, polystyrene, polyethylene, polypropylene, waxes, polybutylene, polybutadiene, copolymers of butadiene and styrene, polyacrylonitrile, resins, polyacrylate esters, polymethacrylate esters polymers containing silyl groups and mixtures thereof.

* * * * *